United States Patent
Towler

[11] Patent Number: 6,079,733
[45] Date of Patent: Jun. 27, 2000

[54] TRIM PIECE CONSTRUCTION FOR AN AIR BAG INSTALLATION

[75] Inventor: Michael P. Towler, Farmington, Mich.

[73] Assignee: TIP Engineering Group, Inc., Farmington Hills, Mich.

[21] Appl. No.: 08/905,695

[22] Filed: Aug. 4, 1997

Related U.S. Application Data

[60] Provisional application No. 60/023,458, Aug. 2, 1996.

[51] Int. Cl.[7] .............................. B60R 21/20; B60R 21/16
[52] U.S. Cl. ...................................... 280/728.3; 280/728.2
[58] Field of Search .............................. 280/728.3, 728.2, 280/731, 732

[56] References Cited

U.S. PATENT DOCUMENTS

| | | | |
|---|---|---|---|
| 4,892,992 | 1/1990 | Akeel et al. | 219/121.78 |
| 5,062,663 | 11/1991 | Satoh | 280/743 |
| 5,125,683 | 6/1992 | Nakajima | 280/728.3 |
| 5,211,422 | 5/1993 | Frantz et al. | 280/740 |
| 5,221,108 | 6/1993 | Hirabayashi | 280/728.3 |
| 5,234,227 | 8/1993 | Webber | 280/728 |
| 5,306,039 | 4/1994 | Nakayama | 280/728.2 |
| 5,449,197 | 9/1995 | Kerner | 280/728.3 |
| 5,588,674 | 12/1996 | Yoshimura et al. | 280/732 |
| 5,639,115 | 6/1997 | Kelley et al. | 280/728.3 |
| 5,676,393 | 10/1997 | Rose | 280/728.2 |
| 5,678,580 | 10/1997 | Ricks et al. | 280/728.2 |
| 5,772,240 | 6/1998 | Vavalidis | 280/728.3 |
| 5,866,224 | 2/1999 | Ang et al. | 280/728.2 |

Primary Examiner—Brian L. Johnson
Assistant Examiner—Michael Britton
Attorney, Agent, or Firm—John R. Benefiel

[57] ABSTRACT

A trim piece construction for an air bag installation in which a scrim sheet is bonded onto the inside of the trim piece at the air bag location, and having one or more unbonded sections folded onto one or more air bag canister sides and attached thereto. The scrim sheet overlaps a deployment door panel and is bonded to surrounding regions to restrain relative movement by attachment to the canister. Fragmentation of the door panel is reduced by bonding of the sheet to the door panel. The door panel hinge is held in position to avoid windshield impact as the door panel hinges open when the air bag deploys.

31 Claims, 4 Drawing Sheets

TRIM PIECE CONSTRUCTION FOR AN AIR BAG INSTALLATION

CROSS-REFERENCE TO RELATED APPLICATION

This application is based on provisional application U.S. Ser. No. 60/023,458, filed Aug. 2, 1996.

BACKGROUND OF THE INVENTION

This invention concerns the construction of interior trim pieces for covering air bag installations in the passenger compartment of vehicles. Currently, an air bag canister containing a stored folded air bag is mounted behind a region of a trim piece defining an opening through which the air bag deploys when inflated in response to a vehicle collision of a predetermined sensed severity. The inflating air bag forces open a covering door panel, which is hinged to an adjacent portion of the trim piece to allow opening the door panel and deployment of the air bag through the resulting opening.

The air bag deployment is quite forceful since it must be deployed with extreme rapidity in order to be properly in position to protect the occupant seated behind the air bag. Hence, powerful reaction forces are exerted on the air bag canister tending to move the same back away from the deployment door panel, resulting in slower opening of the door and delayed deployment of the air bag. The air bag canister thus must be held in position securely so that air bag deployment is not affected.

Also, for so-called invisible seam designs requiring severing of a skin layer, it is desirable that the trim piece regions adjacent the door panel be stabilized so that severing of the trim piece is not delayed by stretching of the trim piece structure under the pressure of the inflating air bag.

U.S. Pat. No. 5,522,616 issued on Jun. 4, 1996 and U.S. Pat. No. 5,393,088 issued on Oct. 5, 1993 describe the use of an anchored frame surrounding the deployment opening to solve this problem.

The door panel must resist the heavy impact of the air bag without fragmentation, and thus must be sturdily constructed of high grade, expensive materials, lest loose fragments be dangerously blasted into the passenger compartment.

Another problem that has been encountered is shifting of the door panel as it hinges open to a sufficient degree to allow impacting the windshield with sufficient force to fracture the same during an air bag deployment.

Construction of the trim piece to satisfy these potential problems tends to increase the cost to manufacture the trim piece.

It is the object of the present invention to provide a lower cost trim piece construction for stabilizing the deployment door panel and adjacent regions of the trim piece relative the air bag canister during air bag deployment, and for insuring that fragmentation of the door panel structure and/or impacting of the door panel against the windshield does not occur.

SUMMARY OF THE INVENTION

The above object of the present invention is achieved by attaching a tough but flexible reinforcing sheet to the inside surface of the trim piece, the sheet of a size so as to overlap the trim piece region where the air bag deployment door panel is located. One or more sections of the perimeter of the sheet may be left unattached and are extended inwardly and securely anchored to restrain movement relative the air bag canister, as by a direct connection to the air bag canister. The sheet at least partially overlies and surrounds the deployment opening on all sides thereof and is bonded thereto so that the connection to the air bag canister restrains relative movement of the trim piece structure away from the air bag canister to insure proper deployment. A portion of the sheet also acts as a door panel hinge reinforcement which, together with the door opening perimeter restraint achieved by the sheet connector, keeps the door panel from shifting out of position as it swings open.

The sheet is preferably bonded to the door panel to reinforce the same and prevent particulation by impact of the air bag, allowing the use of lesser grade material.

The flexible reinforcement sheet preferably comprises an automotive type scrim, such as one formed by a weave of strong fibers which may be coated by a thin polymeric material.

This scrim combines very low tensile elongation, generally less than 200%, preferably less than 100%, with high strength.

Depending on design, one or more layers of sheet may be utilized.

The scrim may be cut or perforated by a laser or other means, before or after bonding the scrim to the trim piece to define the door panel pattern, with the trim piece also perforated or scored at the same time in a preweakening pattern defining the door panel itself which is then separated by the air bag pressure at the moment of deployment.

Alternatively, the sheet can have a precut channel pattern corresponding to the door panel shape to allow preweakening by scoring of just the trim piece structure.

The inwardly folded section of the sheet can be comprised of as few as one side of the sheet, attached to one side of the air bag canister, or more than one free section can be provided, each attached on one of the canister sides.

The connection of the folded sheet section to the canister can be by threaded fasteners, or by an interfit clip or clips attached to each of these components, or by any other sufficiently secure connection.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
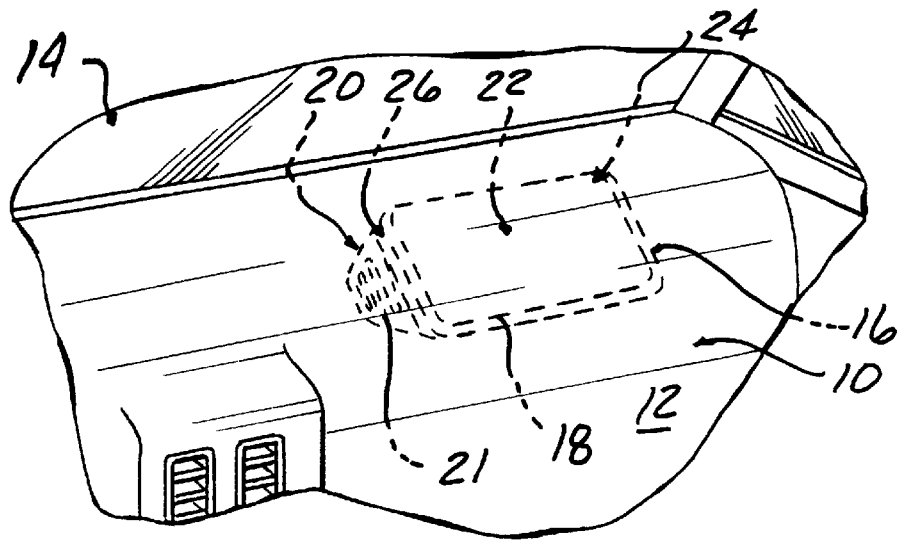
FIG. 1 is a fragmentary view of an instrument panel with an air bag installation, utilizing a reinforcing sheet construction according to the invention.

Referring to the drawings, FIG. 1 shows by way of an example of a trim piece, an instrument panel 10 installed in the passenger compartment 12 of an automotive vehicle 14. Covered by a region of the instrument panel 10 is an air bag installation 16, here located on the front right side of the passenger compartment to provide crash protection for a front seat occupant in the well known manner.

Other air bag installations typically may be arranged within the passenger compartment 12, such as the steering wheel cover for driver's side protection, door side panels, seat rear panels, etc., where the teachings of the present invention is also applicable.

Figure 2:
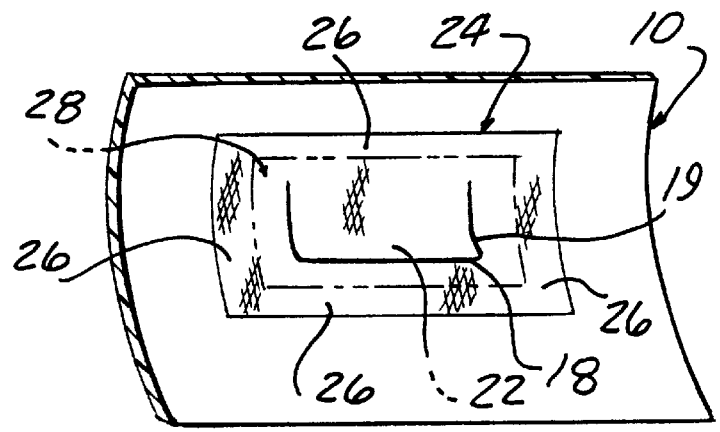
FIG. 2 is a perspective inside view of a fragmentary section of a trim piece with the reinforcing sheet bonded thereto and scored to define the deployment door shape.
Figure 2A:
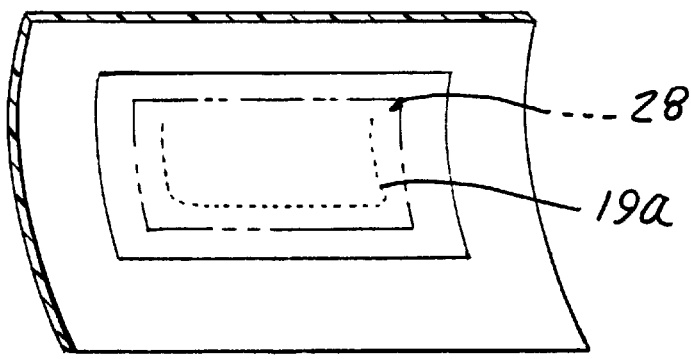
FIG. 2A is a fragmentary view of the trim piece as shown in FIG. 2, showing a perforation preweakening of the reinforcing sheet.

The air bag installation shown is of the "invisible" seam type in which a preweakening pattern 18 is formed into the underside of instrument panel 10 at a location overlying an air bag canister 20 so as to conceal the location of the air bag 21 stored folded within the canister 20. Such preweakening may comprise a groove as shown in FIG. 2, or a perforation as shown in FIG. 2A. The top of the air bag canister 20 is typically rectangular in shape or shown with four sides. The preweakening pattern 18 as shown is in a U-pattern, which forms a single deployment door panel 22 hinged at the top when the air bag inflates, forcing the door panel 22 to open and allow the air bag to deploy into the passenger compartment 12, in the well known manner. Many other preweakening patterns are known and could be used.

If preweakening is done via perforations, the seam may be visible, depending on perforation size. If preweakening is done from the outside surface of the trim piece, this seam likely will be visible.

Other multidoor multihinge patterns can also be employed and are well known.

According to the concept of the present invention, a flexible reinforcing sheet 24 is bonded to the inside of the surface instrument panel 10 overlapping the deployment door panel 22 on all four sides as shown in FIG. 2.

The sheet 24 also has unbonded perimeter sections 26 which are folded inwardly to be positioned along a respective side of the air bag canister 20 and attached thereto.

FIG. 2 shows that the rectangular sheet 24 is bonded in a rectangular region 28. Completely overlapping the preweakening pattern 18 and deployment door panel 22.

The flexible sheet 24 preferably comprises an automotive "scrim" material, which is constructed of a weave of tough fibers, such as nylon that may be encased in a plastic coating to be stabilized for handling while remaining quite flexible.

The sheet 24 may be bonded with a suitable adhesive compatible with the plastic materials used for such application. Sonic welding, heat staking, or other methods may be used. The sheet 24 can be molded to the instrument panel 10 by being placed in the mold when the instrument panel 10 is molded.

The preweakening pattern 18 can be cut through the sheet 24 and into the instrument panel 10 after bonding, as by laser scoring. Rather than cutting through the sheet 24, the sheet can be precut with a channel pattern prior to scoring, as described below.

Figure 3:
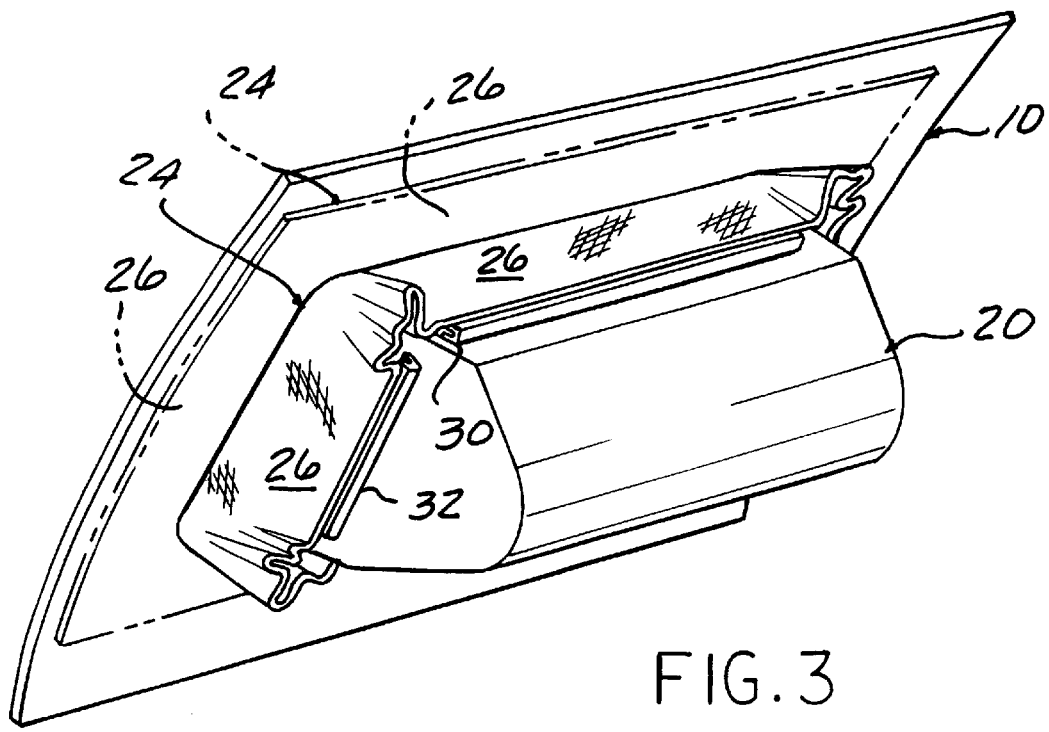
FIG. 3 is an inside view of a fragmentary section of a trim piece with the reinforcing sheet perimeter loose sections folded over and attached to an air bag canister or other fixed support.
Figure 4:
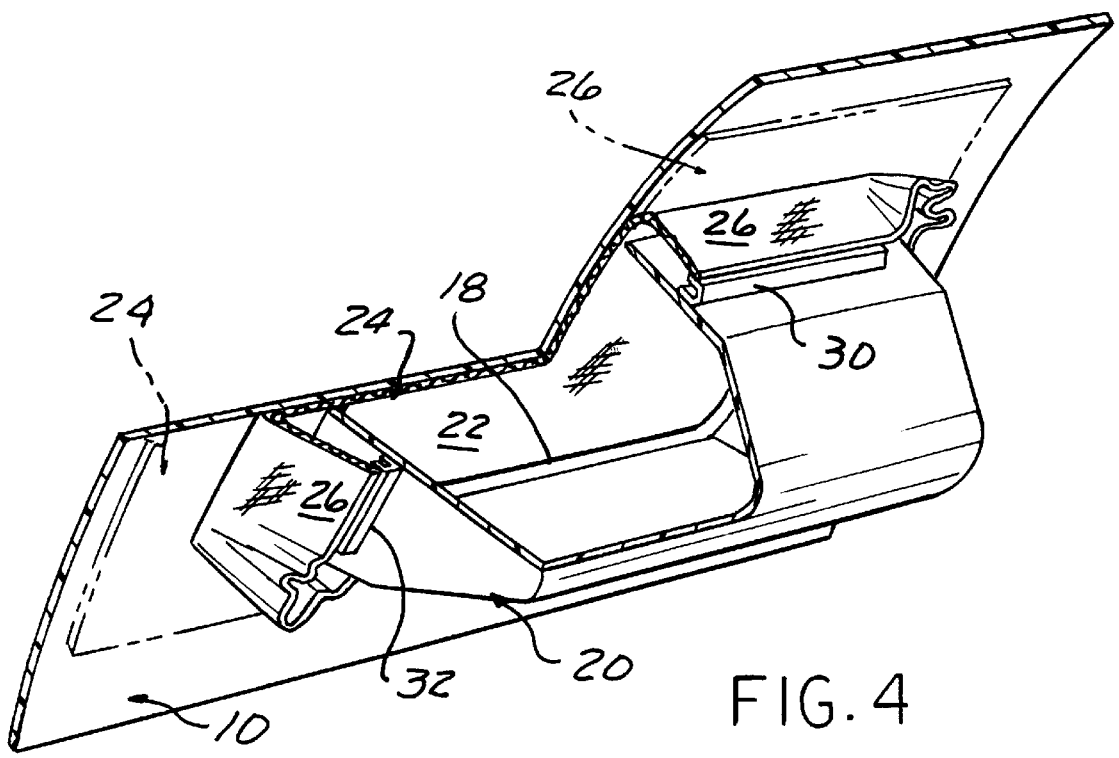
FIG. 4 is the same view as FIG. 3, but with portions of the reinforcing sheet and air bag canister broken away to show additional detail.
Figure 5:
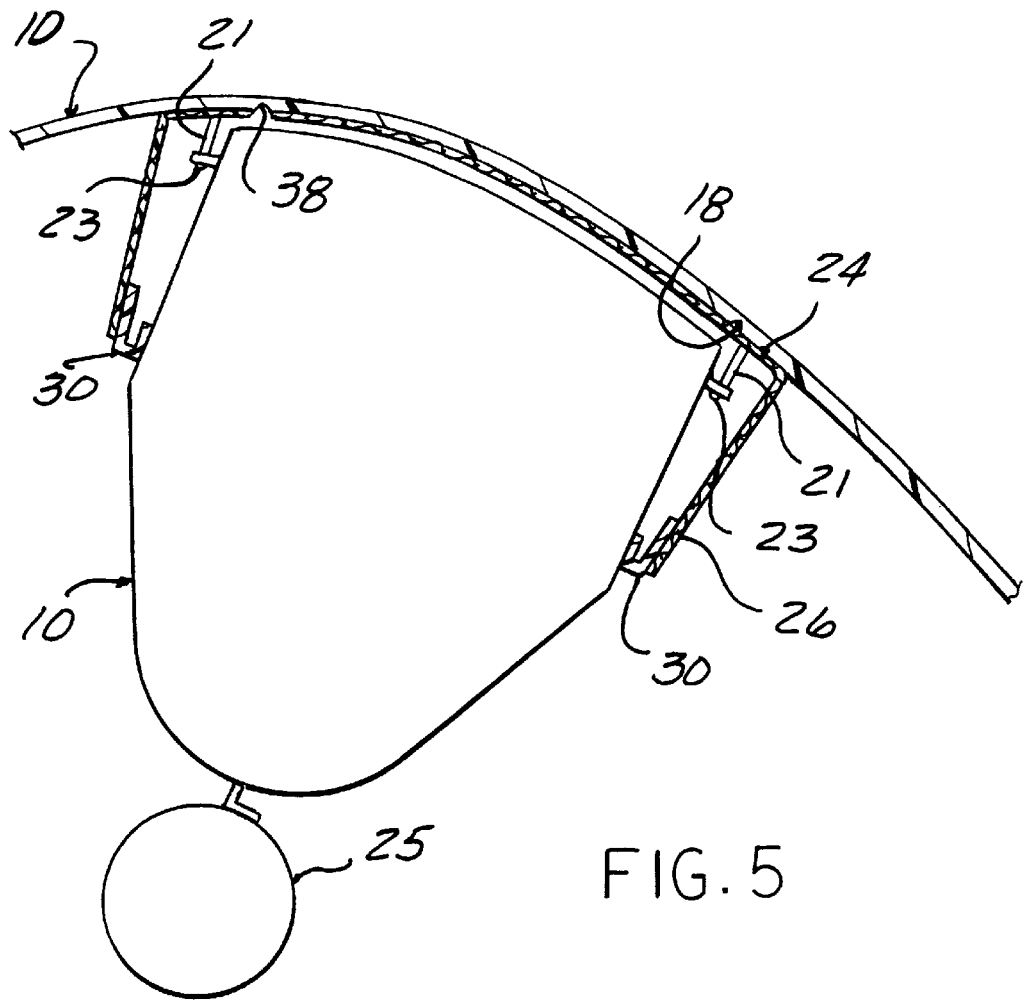
FIG. 5 is a cross section view taken through the trim piece, the reinforcing flexible sheet, and showing the air bag canister outline.

FIGS. 3–5 show the four outer sections 26 respectively folded over the air bag canister four sides and attached using mating clips 30, 32, respectively fixed to outer edges of the sheet 24 and sides of the canister 20.

The air bag canister 20 is contemplated as being attached to the instrument panel 10 so as to be held rigidly in position during handling and assembly as by molded bosses 21 and screws 23 shown in FIG. 5 extending from the inside of the instrument panel 10. This would be preparatory to assembly of the instrument panel 10 and canister 20 to supporting structure such as a cross beam 25.

The sections 26 could be anchored to restrain movement relative to the air bag canister 20 by a connection to other fixed structure such as the cross beam 25.

Figure 3A:
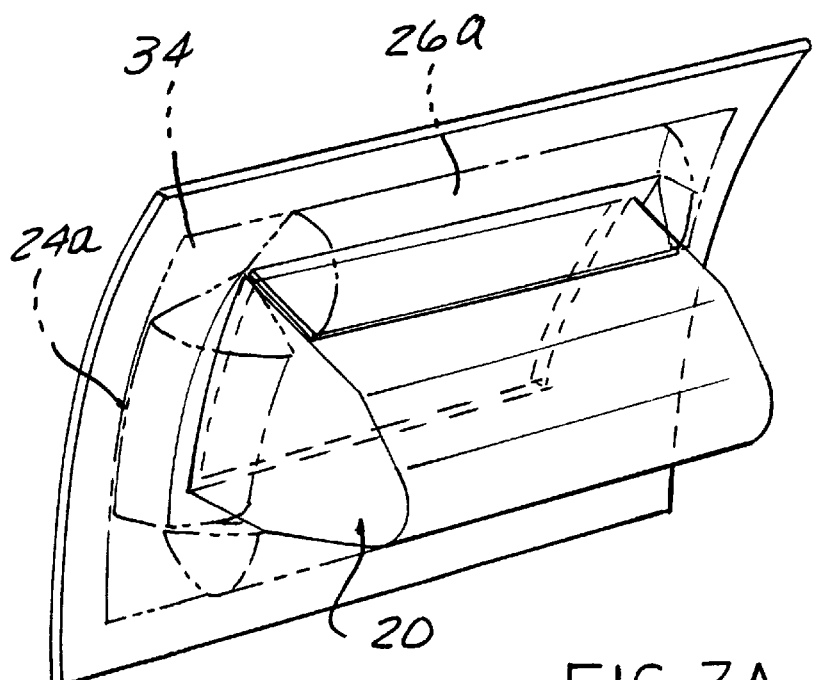
FIG. 3A is the same view as FIG. 3, but with the sheet corners cut out to eliminate the bunching at the corners when the perimeter sections are folded in along four sides.

FIG. 3A illustrates a sheet 24A having cutout corners 34 to provide a neat fit of the sections 26A to the canister 20 without bunched ears as seen in FIG. 3.

As seen in FIG. 5, the preweakening pattern 18 may consist of a groove or perforations scored into the instrument panel 10. A smaller hinging groove 38 on the hinge side may be applied to insure bending of the trim structure along the appropriate line and avoid fracturing.

The preweakening pattern 18 and hinge groove 38 may be molded prior to installing the sheet 34.

The instrument panel 10 shown is represented of a "hard plastic" construction which may be a single molded panel, with the outside surface painted, grained, etc. to improve the appearance.

As noted the invention is also applicable to other trim pieces and to other constructions of such as, vinyl clad, or leather trim which include an outer skin overlying a foam layer attached to one side of a hard plastic or compressed fiber wood substrate. In these cases, the sheet 24 is bonded to the inside of the substrate layer. A wood overlay trim piece can also be so constructed.

Figure 6:
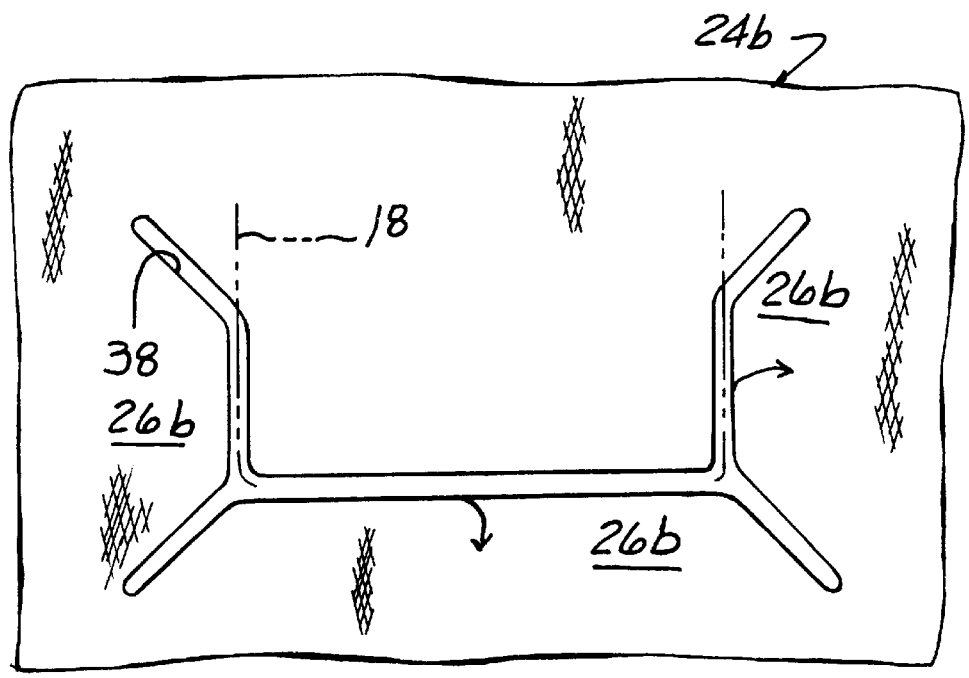
FIG. 6 is a plan view of a precut alternate version of the reinforcing flexible sheet.

FIG. 6 shows another form of the flexible reinforcing sheet 24B which has a channel or slot opening 38 precut before assembly to the instrument panel, which allows the preweakening pattern 18 to be cut without cutting through the sheet 34B. In addition, three unbonded sections 26B are formed which can be folded out from the remaining bonded sections to extend over the canister sides.

The sheet 24B may be preweakened as well such as by forming a series of perforations prior to assembly to the instrument panel 10 or other trim piece, which may also be separately preweakened prior to this assembly.

Figure 7:
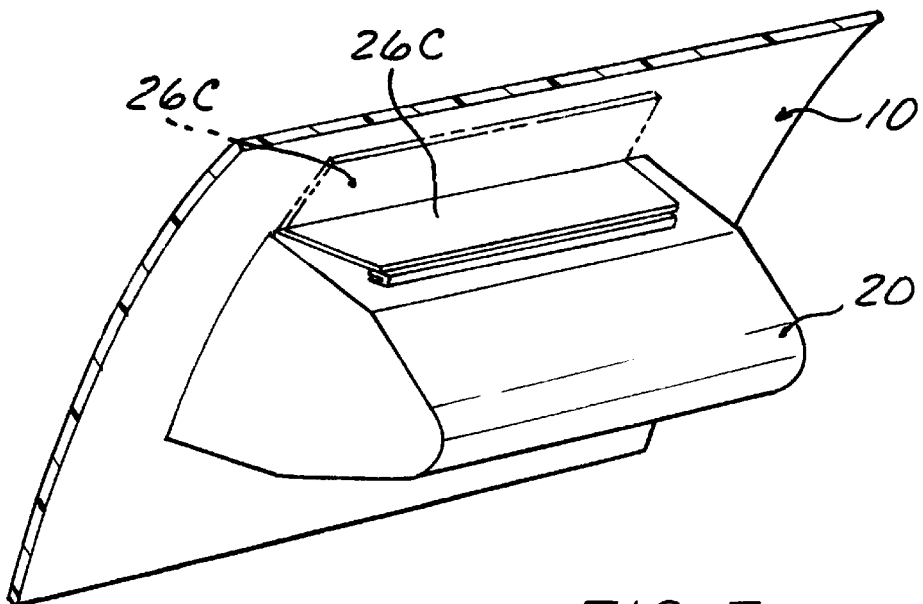
FIG. 7 is a perspective view of a trim piece section with an alternate embodiment of the reinforcement sheet having a loose perimeter section only on the hinging side of the door panel connected to one side of the air bag canister.

FIG. 7 shows a single sheet section 26C on the hinging axis side extended over and attached to one side of the canister 20.

Other arrangements, as for example, of two opposite sections 26C can be utilized.

It will be appreciated from the above that the bonded area of the sheet 28 outside the door panel 22 acts to restrain movement of that area of the instrument panel 10 away from the canister 20 due to the tension in the sections 26. This is accomplished with a lighter, cheaper structure than the frames previously employed.

Fragmentation of the door panel 22 itself is avoided by the bonding of the sheet 24 in the region overlying door the panel 20.

The hinging action is also stabilized, the door panel 22 restrained from stretching the hinge and moving further out to impact the windshield.

Rather than being attached directly to the canister 20, the sheet 24 may be anchored by being attached to other fixed mounting structure, such as the cross beam support, etc. to indirectly restrain relative motion between the instrument panel 10 and the air bag canister.

What is claimed is:

1. An automotive interior trim piece in combination with an air bag canister mounted to be covered by said trim piece, said air bag canister containing a folded stored air bag, said trim piece including a flexible reinforcement sheet attached to an inside surface of said trim piece, said sheet also having at least one section to said trim piece folded in from said inside surface, and anchored to structure other than said trim piece so as to restrain relative movement between said trim piece and said air bag canister when said air bag is inflated.

2. The trim piece-air bag combination according to claim 1 wherein said at least one folded in section of said sheet is attached to said air bag canister to be anchored relative thereto.

3. The trim piece-air bag combination according to claim 2 wherein said trim piece includes a deployment door panel overlying said air bag canister, said door panel having a plurality of sides and hinged along one of said sides open upon deployment of said air bag to form a deployment opening in said trim piece allowing said air bag to be deployed therethrough upon inflation thereof, said sheet overlapping an inside surface of said door panel, extending to adjacent regions said trim piece inside surface adjacent each side of said door panel, said sheet bonded to said adjacent regions of said trim piece inside surface.

4. The trim piece-air bag combination according to claim 3 wherein said sheet is also bonded to said inside surface of said door panel to prevent fragmentation thereof.

5. The trim piece-air bag combination according to claim 2 wherein said sheet comprises automotive scrim material.

6. The trim piece-air bag combination according to claim 3 wherein said sheet is rectangular and has four unbonded outer sections, each folded out over a respective one of four sides of said air bag canister and attached thereto.

7. The trim piece-air bag combination according to claim 2 wherein said sheet section is attached to said canister by interfit clips.

8. The trim piece-air bag combination according to claim 3 wherein said trim piece has a preweakening pattern formed thereinto to define said door panel having a hinging axis on one side, said sheet overlapping said door panel and said hinging axis.

9. The trim piece-air bag combination according to claim 8 wherein said one section of said sheet is aligned with said hinging axis.

10. The trim piece air bag combination according to claim 8 wherein said sheet has a cutout channel pattern lying over said preweakening pattern of said trim piece to allow preweakening of said trim piece by cutting into an exposed area of said inside surface of said trim piece within said channel pattern.

11. The trim piece air bag combination according to claim 8 wherein said sheet has four outer sheet sections not bonded to said inside surface, said outer sections each folded in over four sides of said air bag canister.

12. The trim piece-air bag combination according to claim 8 wherein said preweakening pattern comprises a series of perforations.

13. The trim piece-air bag combination according to claim 8 wherein said sheet has a separately formed preweakening pattern there in.

14. The trim piece-air bag combination according to claim 2 wherein said sheet has a tensile elongation less than 200% when said air bag is deployed.

15. A method of constructing an automotive trim piece covering an air bag canister containing a stored folded air bag, comprising the steps of:

defining a hinged door panel in said trim piece covering said air bag canister so as to enable said door panel to hinge open and form a deployment opening in said trim piece for said air bag upon inflation thereof;

attaching a main section of a flexible reinforcing sheet to an inside surface of said trim piece overlying said door panel;

folding in an outer section of said sheet away from said inside surface; and anchoring said outer section of said sheet so as to restrain movement of said trim piece away from said air bag canister when said air bag is deployed.

16. The method according to claim 15 wherein said anchoring step comprises the step of attaching said folded outer section of said sheet to said air bag canister.

17. The method according to claim 15 further including the step of overlapping said door panel and adjacent regions of an inside surface of said trim piece with said main section of said folding sheet, and extending said folded outer section of said sheet to said air bag canister and attaching said outer section thereto.

18. The method according to claim 15 further including the step of forming a preweakening pattern in said trim piece to define said door panel.

19. The method according to claim 18 further including the step of cutting through said sheet and into said trim piece inside surface when forming said preweakening pattern.

20. The method according to claim 17 wherein said sheet is generally rectangular and has four outer sections, further including the step of folding said outer sections out from said main section of said sheet attached to said trim piece inside surface and over a respective one of four sides of said air bag canister.

21. The method according to claim 16 further including the steps of attaching interfit clips to said sheet section and said air bag canister respectively to attach said sheet section to said air bag canister.

22. The method according to claim 18 wherein said sheet is cut out in a channel pattern corresponding to said preweakening pattern in said trim piece prior to preweakening said trim piece, and thereafter preweakening said trim piece by cutting into said trim piece inside surface exposed within said channel in said sheet, whereby cutting of said sheet does not occur when said trim piece is cut to be preweakened.

23. The method according to claim 18 wherein said preweakening pattern is formed to define a hinging side of said deployment door panel, said sheet section extended over said hinging side and attached to said air bag canister.

24. The method according to claim 18 wherein said preweakening step is accomplished by forming a series of perforations through said trim piece.

25. The method according to claim 18 further including the step of also preweakening said sheet in a pattern corresponding to said preweakening pattern of said trim piece, said preweakening of said sheet carried out separately and prior to attaching said sheet to said trim piece.

26. A method of reinforcing an interior trim piece in a section covering an air bag installation to resist fragmentation, and said interior trim piece preweakened in a pattern to allow a multisided deployment door to be formed by the pressure exerted by a deploying air bag, said method including the steps of:

bonding a flexible reinforcement sheet to an inside surface of said covering section of said trim piece said reinforcement sheet extending over all sides of said door and onto adjacent areas of said trim piece inside surface; and, cutting said reinforcement sheet along said preweakening pattern of said deployment door, whereby said bonded flexible reinforcement sheet resists fragmentation and said cutting of said sheet preweakens a composite structure formed by said trim piece and reinforcement sheet so as to cause said deployment door to be formed in said trim piece when said air bag is deployed.

27. The method according to claim 26 wherein said cutting step is carried out by directing a laser beam at said reinforcement sheet.

28. The method according to claim 27 wherein in said cutting step, said laser beam cuts said flexible reinforcement layer and penetrates into said trim piece so as to cause said preweakening of said trim piece.

29. The method according to claim 26 wherein said flexible reinforcement sheet is bonded to said trim piece inside surface by being molded together.

30. The method according to claim 26 wherein in said cutting step a groove is cut through said flexible reinforcement layer and into said trim piece.

31. The method according to claim 26 wherein in said cutting step, perforations are cut into said flexible reinforcement sheet.

* * * * *

UNITED STATES PATENT AND TRADEMARK OFFICE
CERTIFICATE OF CORRECTION

PATENT NO. : 6,079,733
DATED : June 27, 2000
INVENTOR(S) : Michael P. Towler

It is certified that error appears in the above-identified patent and that said Letters Patent is hereby corrected as shown below:

Column 2, line 3, after "thereof" insert --,--.

Column 2, line 9, delete "connector" insert therefor --connection--.

Column 3, line 15, after "shows" insert --,--.

Column 3, line 48, after "inside" insert --surface--.

Column 3, line 49, delete "surface".

Column 3, line 56, delete ". Completely" insert therefor --completely--.

Column 4, line 35, after "As noted" insert --,--.

Column 4, line 36, after "such as," insert --skin and foam,--.

Column 4, line 44, after "panel" insert --10--.

Column 4, line 66, delete "door the" insert therefor --the door--.

UNITED STATES PATENT AND TRADEMARK OFFICE
CERTIFICATE OF CORRECTION

PATENT NO. : 6,079,733

DATED : June 27, 2000

INVENTOR(S) : Michael P. Towler

It is certified that error appears in the above-identified patent and that said Letters Patent is hereby corrected as shown below:

Column 4, line 30, delete "34" insert therefor --24--.

Column 4, line 46, delete "34B" insert therefor --24B--.

Column 5, line 52, delete "piece air" insert therefor --piece-air--.

Column 5, line 58, delete "piece air" insert therefor --piece-air--.

Column 5, line 67, delete "there in" insert therefor --therein--.

UNITED STATES PATENT AND TRADEMARK OFFICE
CERTIFICATE OF CORRECTION

PATENT NO. : 6,079,733
DATED : June 27, 2000
INVENTOR(S) : Michael P. Towler

It is certified that error appears in the above-identified patent and that said Letters Patent is hereby corrected as shown below:

Figure 2, delete reference numeral "19" insert therefor --18--.

Figure 2A, delete reference numeral "19a" insert therefor --18--.

Figure 5, delete reference numeral "38" insert therefor --18--.

Figure 5, delete reference numeral "18" insert therefor --38--.

Figure 5, delete reference numeral "10", near the bottom of figure, insert therefor --20--.

Signed and Sealed this

Twenty-ninth Day of May, 2001

Attest:

NICHOLAS P. GODICI

*Attesting Officer*     *Acting Director of the United States Patent and Trademark Office*